C. L. TUCKER.

Package for Holding and Shipping Lard.

No. 3,037. Reissued July 14, 1868.

Witnesses
L. L. Rand
E. F. Hill

Inventor
Charles L. Tucker

N. PETERS, Photo-Lithographer, Washington, D. C.

UNITED STATES PATENT OFFICE.

CHARLES L. TUCKER, OF CHICAGO, ILLINOIS.

IMPROVEMENT IN THE MANUFACTURE AND PRESERVATION OF LARD.

Specification forming part of Letters Patent No. 66,268, dated July 2, 1867; Reissue No. 3,037, dated July 14, 1868.

*To all whom it may concern:*

Be it known that I, CHARLES LAFAYETTE TUCKER, of the city of Chicago, in the county of Cook and State of Illinois, have invented a certain new and Improved Package for Holding Lard; and I do declare that the following is a full, clear, and exact description thereof, reference being had to the accompanying drawings, making a part of this specification, in which—

Figure 1:
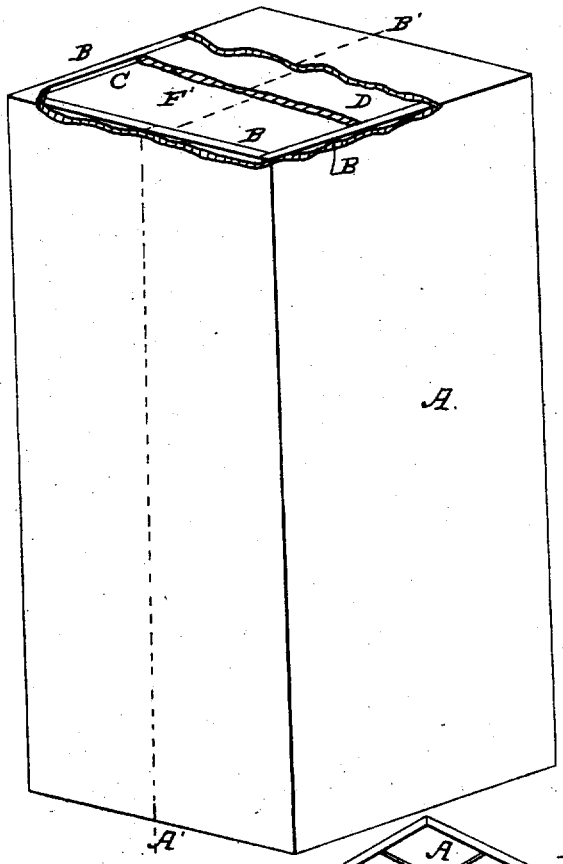
Figure 2:
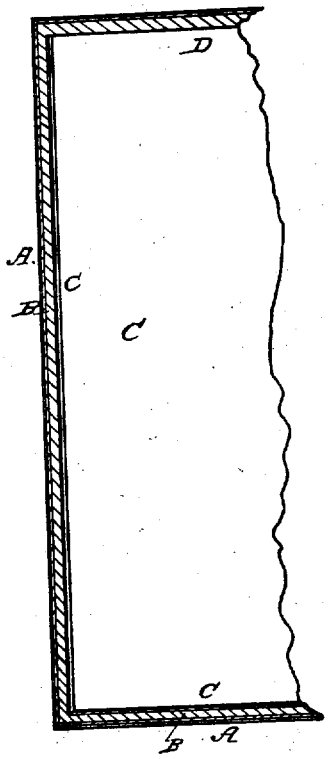
Figure 3:
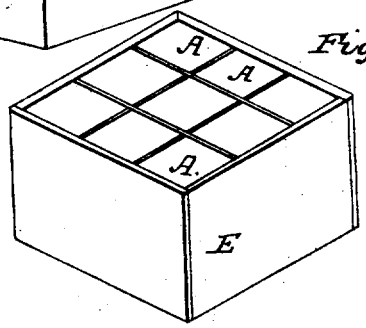

Figure 1 is a perspective view, with a portion of the top removed; Fig. 2, a vertical section showing one side. Fig. 3 is not essential to this specification.

Like letters refer to the same parts in all the figures.

Lard has been heretofore packed in tierces, barrels, kegs, tubs, and pails, and when so packed is subject to great loss from absorption and leakage. As heretofore handled it has been an inconvenient and unprofitable article for the retailer to deal in. It has been sometimes packed in tin, but only to a limited extent, as tin is very expensive for small packages, and is opened with difficulty.

My invention consists in overcoming these difficulties, and in constructing a small, cheap, and perfectly-tight package, of wood or paper, or both, for holding lard, so that it can be conveniently handled and without waste; in giving such box a lining or coating impervious to and insoluble in oil, either by applying the substance used for such coating directly to the package or by the use of a paper or other suitable lining coated with such substance, and in so constructing such box or package that there will be no lid or cover rim to interfere with packing in cases.

To enable others skilled in the art to make and use my invention, I proceed to describe the same.

I construct my package square for economy of space; but it may be made round. The body of the package can be most conveniently made of a single thin strip of wood. The strips of wood may be cut by any machinery in use for that purpose, and may be from one-eighth to one-sixteenth of an inch in thickness, and of sufficient width for the required depth of the box to be made. I find it most convenient for the trade to make packages containing one, three, five, and ten pounds, respectively; but other sizes can be used. The interior dimensions of a box calculated to hold one pound in its most convenient form will be four inches by two and one-half inches across and three and a half inches deep, and for a box designed to hold ten pounds six and three-fourths inches across and seven and one-half inches deep. The dimensions of other sizes can be readily determined. As I use a single piece for the body or sides, there is only a single joint, which may be secured by glue. The bottom B′, which is about three-eighths of an inch thick, I insert within the body or sides and secure the same thereto by the use of tacks, glue, or other suitable means. I then apply to the inside a surfacing of gum-arabic in solution. In preparing this solution I usually add a little glycerine, glue, or isinglass to prevent cracking. The use of glycerine I also find advantageous on account of its antiseptic quality. By the use of such coating the pores and seams of the wood and openings caused by imperfect construction are effectually closed and waste from leakage and absorption entirely prevented. I attain the same results by lining the package with paper or other suitable substance coated or saturated with the solution used, or by so saturating the box itself.

I find by experiment that several substances may be used instead of gum-arabic; but I prefer gum-arabic, as it is not only insoluble in oil, but is inodorous and perfectly harmless in case any of its particles become mixed with the lard.

Common paste or straw board may be used in constructing my package; but I make the top and bottom of wood inserted and secured as described when paper sides are used.

When the boxes have been fully prepared, as described, they are to be filled with lard at as low a temperature as can be used and permit a ready flow. When sufficiently filled, the top, having been provided with a coating or lining, as before described, is inserted within the sides of the box, leaving a little space between the lard and such top, and secured in place by means of tacks, glue, or in any other convenient manner. I make the tops of the same thickness as the bottoms, and without any band or rim.

When ready for market, my package is perfectly smooth on all sides, having no points or projections to injure adjoining boxes when packed in cases, and the package can be placed in any position without danger of leakage.

Having thus fully described my invention, what I claim as new, and desire to secure by Letters Patent, is—

1. The box herein described, when constructed without a lid or cover rim, and with straight even sides from top to bottom, substantially as and for the purposes specified.

2. The application of gum-arabic or its equivalent to lard-packages for the purpose of making them tight and non-absorbing, substantially as specified.

CHARLES L. TUCKER.

Witnesses:
L. L. BOND,
E. A. WEST.